United States Patent
Nam et al.

(10) Patent No.: US 12,165,648 B2
(45) Date of Patent: Dec. 10, 2024

(54) ELECTRONIC DEVICE AND OPERATION METHOD THEREOF

(71) Applicant: Samsung Electronics Co., Ltd., Gyeonggi-do (KR)

(72) Inventors: Kihyung Nam, Gyeonggi-do (KR); Seokyeong Jung, Gyeonggi-do (KR); Jungkeun Cho, Gyeonggi-do (KR); Jinwoong Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 17/824,023

(22) Filed: May 25, 2022

(65) Prior Publication Data
US 2022/0383877 A1    Dec. 1, 2022

Related U.S. Application Data

(63) Continuation of application No. PCT/KR2022/007233, filed on May 20, 2022.

(30) Foreign Application Priority Data

May 25, 2021   (KR) .................. 10-2021-0067183

(51) Int. Cl.
| | |
|---|---|
| *G10L 15/26* | (2006.01) |
| *G06F 40/268* | (2020.01) |
| *G10L 15/02* | (2006.01) |
| *G10L 15/06* | (2013.01) |

(52) U.S. Cl.
CPC ............ *G10L 15/26* (2013.01); *G06F 40/268* (2020.01); *G10L 15/02* (2013.01); *G10L 15/063* (2013.01)

(58) Field of Classification Search
None
See application file for complete search history.

(56) References Cited

U.S. PATENT DOCUMENTS

| | | |
|---|---|---|
| 8,473,289 B2 | 6/2013 | Jitkoff et al. |
| 8,677,574 B1 | 3/2014 | Thiessen et al. |
| 8,880,405 B2 | 11/2014 | Cerra et al. |
| 8,996,379 B2 | 3/2015 | Cerra et al. |

(Continued)

FOREIGN PATENT DOCUMENTS

| | | |
|---|---|---|
| JP | 2021-71723 A | 5/2021 |
| KR | 10-2013-0101505 A | 9/2013 |

(Continued)

OTHER PUBLICATIONS

International Search Report dated Aug. 22, 2022.

*Primary Examiner* — Stella L. Woo

(74) *Attorney, Agent, or Firm* — Cha & Reiter, LLC

(57) ABSTRACT

An electronic device and method are disclosed. The electronic device includes input circuitry, a display, and a processor. The processor implements the method, including extracting at least one piece of context information based at least in part on an application screen displayed on the display, analyzing the extracted at least one piece of context information to generate a language model based on the extracted at least one piece of context information, receiving a voice input of a user through the input circuitry and convert the voice input into a text string using the generated language model, and resetting the generated language model.

20 Claims, 11 Drawing Sheets

(56) References Cited

U.S. PATENT DOCUMENTS

| | | |
|---|---|---|
| 9,053,706 B2 | 6/2015 | Jitkoff et al. |
| 11,164,565 B2 | 11/2021 | Lee |
| 11,289,074 B2 | 3/2022 | Lee |
| 11,367,442 B2 | 6/2022 | Lee et al. |
| 11,386,892 B2 | 7/2022 | Novitchenko et al. |
| 11,455,989 B2 | 9/2022 | Lee et al. |
| 11,551,682 B2 | 1/2023 | Kim et al. |
| 2008/0221884 A1 | 9/2008 | Cerra et al. |
| 2009/0030696 A1 | 1/2009 | Cerra et al. |
| 2009/0106195 A1* | 4/2009 | Tateno ............... G06F 16/951 |
| 2011/0029301 A1 | 2/2011 | Han et al. |
| 2016/0336006 A1* | 11/2016 | Levit .................. G10L 15/063 |
| 2020/0057604 A1* | 2/2020 | Jeon ................... G06F 40/295 |
| 2020/0160838 A1* | 5/2020 | Lee .................... G10L 15/183 |
| 2020/0349927 A1* | 11/2020 | Stoimenov ............ G10L 17/24 |
| 2022/0050884 A1* | 2/2022 | Sahu .................... G06N 5/04 |
| 2022/0189469 A1* | 6/2022 | Carbune ............... G10L 15/22 |

FOREIGN PATENT DOCUMENTS

| | | |
|---|---|---|
| KR | 10-2019-0096876 A | 8/2019 |
| KR | 10-2020-0059054 A | 5/2020 |
| KR | 10-2021-0039049 A | 4/2021 |

\* cited by examiner

ELECTRONIC DEVICE AND OPERATION METHOD THEREOF

CROSS-REFERENCE TO RELATED APPLICATION(S)

This application is a continuation of PCT International Application No. PCT/KR2022/007233, which was filed on May 20, 2022, and claims priority to Korean Patent Application No. 10-2021-0067183, filed on May 25, 2021, in the Korean Intellectual Property Office, the disclosures of which are incorporated by reference herein their entirety.

TECHNICAL FIELD

Certain embodiments disclosed in this disclosure relate to artificial intelligence (AI), and, more particularly, to AI-based voice commands for electronic devices.

DESCRIPTION OF RELATED ART

With the development of artificial intelligence (AI) technology, electronic devices increasingly incorporate AI in voice assistance applications. Such devices often support conventional mouse, keyboard and touch screen inputs, to which may be added voice input processes. For example, devices such as smartphones and tablets may receive a user's voice input, and provide a corresponding operation.

Speech recognition services are being developed, which aim to facilitate user inputs using natural language. The underlying technology requires the device to interpret an intent of the user's input/utterance, and generate a result matching the desired intent. This may allow a user to give commands to an AI assistant, or even simulate a conversation with the AI.

Accordingly, it may be desirable to improve the performance of automatic speech recognition (ASR) systems.

SUMMARY

Technical problems to be achieved by an embodiment disclosed in this disclosure are to provide a method and device for improving the voice recognition performance of a voice assistant.

Technical problems to be achieved by an embodiment disclosed in this disclosure are to provide a method and device for improving the voice recognition performance of a voice assistant by using a screen displayed on a display of an electronic device when a user utterance is received.

Technical problems to be achieved by an embodiment disclosed in this disclosure are to provide a method and device for providing a user with a consistent user experience by a user input for a wake-up word.

Technical problems to be achieved by an embodiment disclosed in this disclosure are to provide a method and device for improving the voice recognition performance of a voice assistant while reducing memory usage by using a real-time learning model.

Technical problems to be achieved by an embodiment disclosed in this disclosure are to provide a method and device for displaying more accurate ASR data even when inaccurate data is received, as an electronic device generates a real-time language model by using information extracted from a screen.

Technical problems to be achieved by an embodiment disclosed in this disclosure are to provide a method and device for displaying ASR data including additional information (e.g., special characters) when information that the user has actually intended to utter includes additional information (e.g., special characters), as an electronic device generates a real-time language model by using information extracted from a screen and information associated with the extracted information.

In certain embodiments of the disclosure, an electronic device may include: input circuitry, a display, a processor operatively connected to the input interface, and a memory operatively connected to the processor, wherein the memory stores instructions that, when executed, cause the processor to extract at least one piece of context information based at least in part on an application screen displayed on the display, analyze the extracted at least one piece of context information to generate a language model based on the extracted at least one piece of context information, receive a voice input of a user through the input circuitry and convert the voice input into a text string using the generated language model, and reset the generated language model.

In certain embodiments of the disclosure, a method in an electronic device is disclosed, including extracting, via at least one processor, at least one piece of context information from a screen displayed on a display, analyzing, via the at least one processor, the extracted at least one context to generate a language model based on the analyzed at least one piece of context information, receiving, via an input circuitry, a voice input of a user and converting the voice input, via the least one processor, into a text string using the generated language model, and resetting the generated language model.

With regard to description of drawings, the same or similar components will be marked by the same or similar reference signs.

DETAILED DESCRIPTION

Hereinafter, certain embodiments of the disclosure may be described with reference to accompanying drawings. However, it should be understood that this is not intended to limit the disclosure to specific implementation forms and includes various modifications, equivalents, and/or alternatives of embodiments of the disclosure.

Certain embodiments of the disclosure may improve the voice recognition performance of a voice assistant.

According to certain embodiments, voice recognition performance of a voice assistant may be improved, by considering the context of a screen displayed on a display of an electronic device, when a user utterance is received.

According to certain embodiments, a consistency of the user experience may be improved when using a wake-up word.

According to certain embodiments, voice recognition performance of a voice assistant may be improved even while reducing memory usage by a real-time learning model.

According to certain embodiments, the accuracy of ASR may be maintained or improved even when an inaccurate voice input is received, using a real-time language model generated in part from information extracted from a present display screen.

According to embodiments disclosed in the disclosure, additional information (e.g., special characters) may be considered in voice recognition, as the electronic device generates a real-time language model using information extracted from a screen, and information associated with the extracted information.

Further, a variety of effects and advantages may be directly or indirectly understood through the disclosure as provided.

Figure 1:
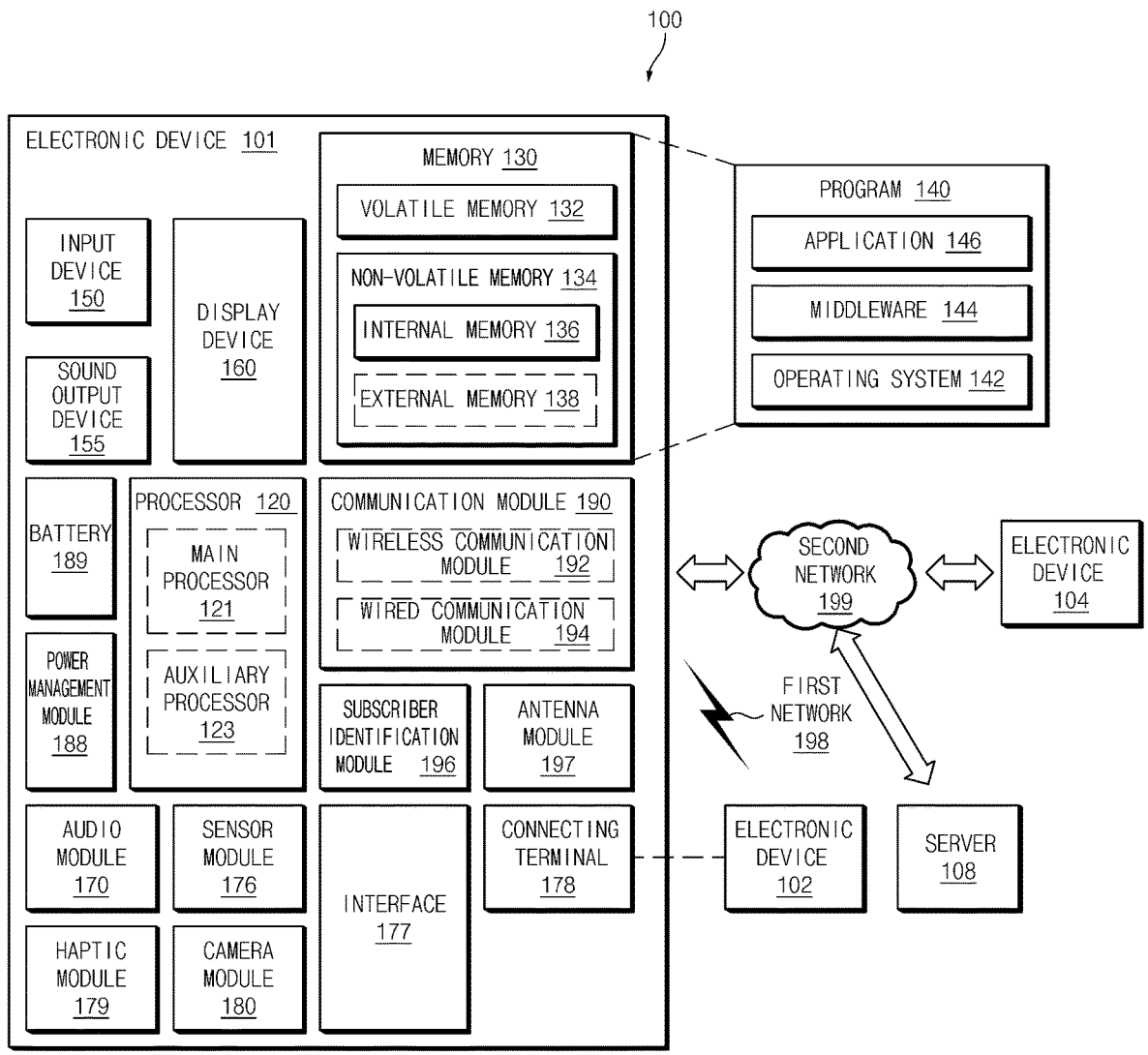
FIG. 1 is a block diagram of an electronic device in a network environment, according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display device 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, a key (e.g., a button), or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
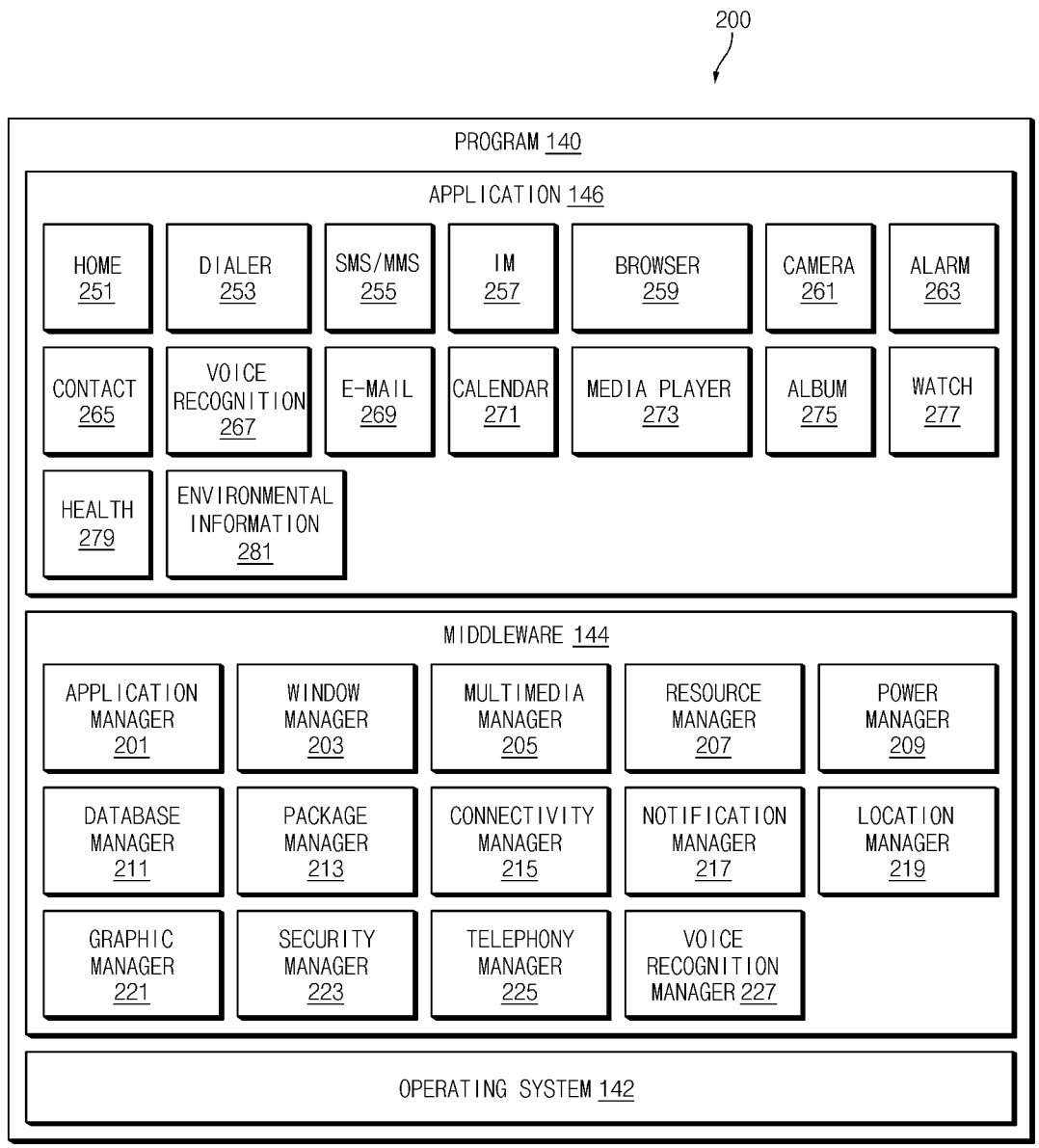
FIG. 2 is a block diagram of a program, according to certain embodiments.

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
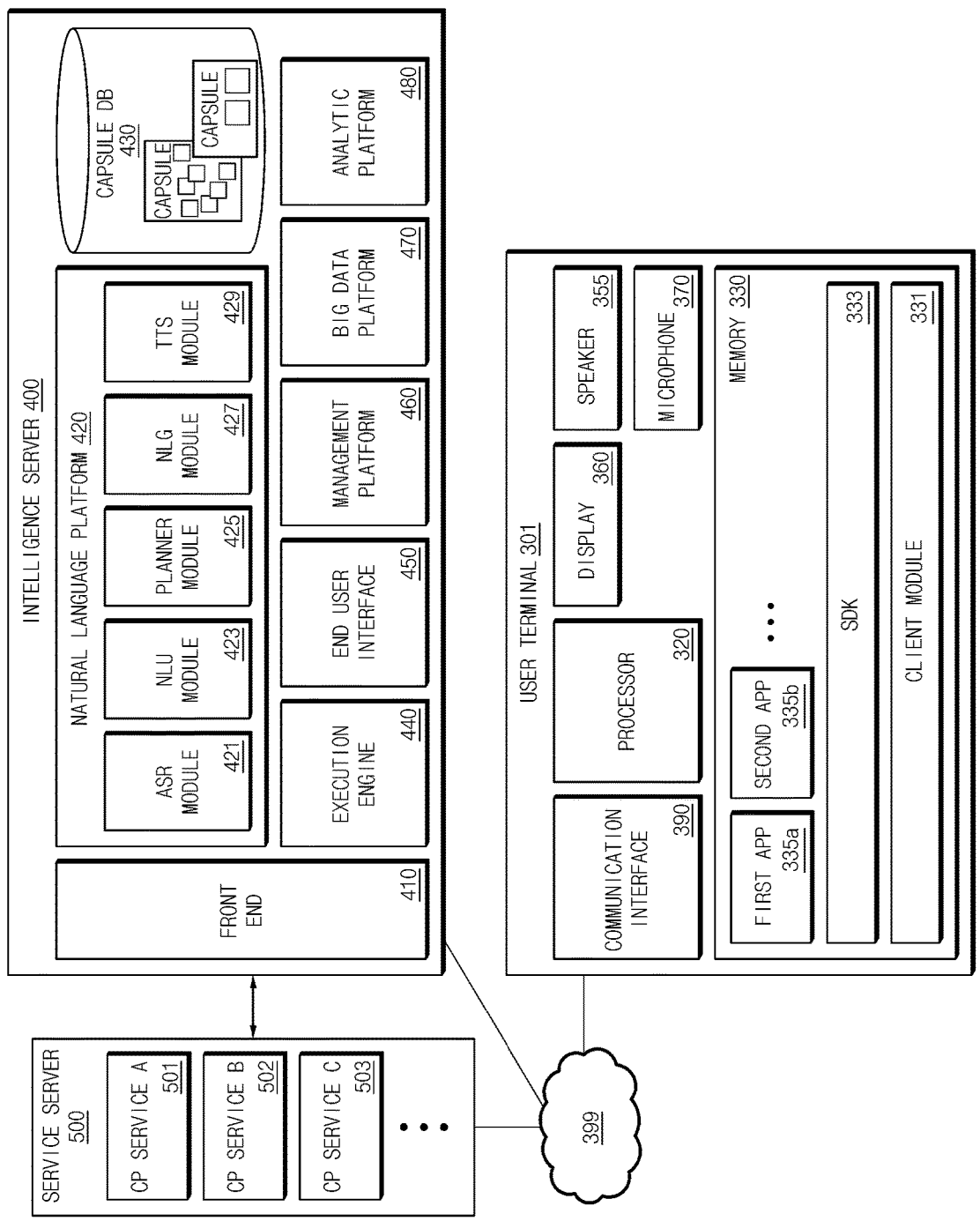
FIG. 3 is a block diagram illustrating an integrated intelligence system, according to an embodiment.

FIG. 3 is a block diagram illustrating an integrated intelligence system, according to an embodiment.

Referring to FIG. 3, an integrated intelligence system according to an embodiment may include a user terminal 301, an intelligence server 400, and a service server 500.

The user terminal 301 according to an embodiment may be an electronic device capable of connecting to Internet, and may be, for example, a mobile phone, a smartphone, a personal digital assistant (PDA), a notebook computer, a television (TV), a household appliance, a wearable smart device, a head mounted display (HMD), or a smart speaker.

According to the illustrated embodiment, the user terminal 301 may include a communication interface 390, a microphone 370, a speaker 355, a display 360, a memory 330, or a processor 320. The listed components may be operatively or electrically connected to one another.

The communication interface 390 according to an embodiment may be connected to an external device and may be configured to transmit or receive data to or from the external device. The microphone 370 according to an embodiment may receive a sound (e.g., a user utterance), and convert the sound into an electrical signal. The speaker 355 according to an embodiment may output the electrical signal as sound (e.g., voice). The display 360 according to an embodiment may be configured to display an image or a video. The display 360 according to an embodiment may display the graphic user interface (GUI) of the executed app (or an application program).

The memory 330 according to an embodiment may store a client module 331, a software development kit (SDK) 333, and a plurality of apps 335*a*, 335*b*, etc. The client module 331 and the SDK 333 may include a framework (or a solution program) for performing general-purposed functions. Furthermore, the client module 331 or the SDK 333 may include the framework for processing a voice input.

The plurality of apps 335*a*, 335*b*, etc. may be programs for performing a specified function. According to an embodiment, the plurality of apps may include a first app 335*a* and/or a second app 335*b*. According to an embodiment, each of the plurality of apps 335*a*, 335*b*, etc. may include a plurality of actions for performing a specified function. For example, the apps may include an alarm app, a message app, and/or a scheduler app. According to an embodiment, the plurality of apps 335*a*, 335*b*, etc. may be executed by the processor 320 to sequentially execute at least part of the plurality of actions.

According to an embodiment, the processor 320 may control overall operations of the user terminal 301. For example, the processor 320 may be electrically connected to the communication interface 390, the microphone 370, the speaker 355, and the display 360 to perform a specified operation. For example, the processor 320 may include at least one processor.

Moreover, the processor 320 according to an embodiment may execute the program stored in the memory 330 so as to perform a specified function. For example, according to an embodiment, the processor 320 may execute at least one of the client module 331 or the SDK 333 so as to perform a following operation for processing a voice input. The processor 320 may control operations of the plurality of apps 335*a*, 335*b*, etc. via the SDK 333. The following actions described as the actions of the client module 331 or the SDK 333 may be the actions performed by the execution of the processor 320.

According to an embodiment, the client module 331 may receive a voice input. For example, the client module 331 may receive a voice signal corresponding to a user utterance detected through the microphone 370. The client module 331 may transmit the received voice input (e.g., a voice input) to the intelligence server 400. The client module 331 may transmit state information of the user terminal 301 to the intelligence server 400 together with the received voice input. For example, the state information may be execution state information of an app.

According to an embodiment, the client module 331 may receive a result corresponding to the received voice input. For example, when the intelligence server 400 is capable of calculating the result corresponding to the received voice input, the client module 331 may receive the result corresponding to the received voice input. The client module 331 may display the received result on the display 360.

According to an embodiment, the client module 331 may receive a plan corresponding to the received voice input. The client module 331 may display, on the display 360, a result of executing a plurality of actions of an app depending on the plan. For example, the client module 331 may sequentially display the result of executing the plurality of actions on a display. As another example, the user terminal 301 may display a part of results (e.g., a result of the last action) of executing the plurality of actions, on the display.

According to an embodiment, the client module 331 may receive a request for obtaining information utilized to calculate the result corresponding to a voice input, from the intelligence server 400. According to an embodiment, the client module 331 may transmit the information to the intelligence server 400 in response to the request.

According to an embodiment, the client module 331 may transmit, to the intelligence server 400, information about the result of executing a plurality of actions depending on the plan. The intelligence server 400 may identify that the received voice input is correctly processed, using the result information.

According to an embodiment, the client module 331 may include a speech recognition module. According to an embodiment, the client module 331 may recognize a voice input for performing a limited function, via the speech recognition module. For example, the client module 331 may launch an intelligence app for processing a specific voice input by performing an organic action, in response to receiving a prespecified voice input (e.g., wake up!).

According to an embodiment, the intelligence server 400 may receive information associated with a user's voice input from the user terminal 301 over a communication network. According to an embodiment, the intelligence server 400 may convert data associated with the received voice input to text data. According to an embodiment, the intelligence server 400 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 400 may transmit a result according to the generated plan to the user terminal 301 or may transmit the generated plan to the user terminal 301. According to an embodiment, the user terminal 301 may display the result according to the plan, on a display. According to an embodiment, the user terminal 301 may display a result of executing the action according to the plan, on the display.

The intelligence server 400 according to an embodiment may include a front end 410, a natural language platform 420, a capsule database 430, an execution engine 440, an end-user interface 450, a management platform 460, a big data platform 470, or an analytic platform 480.

According to an embodiment, the front end 410 may receive a voice input received from the user terminal 301. The front end 410 may transmit a response corresponding to the voice input to the user terminal 301.

According to an embodiment, the natural language platform 420 may include an automatic speech recognition (ASR) module 421, a natural language understanding (NLU) module 423, a planner module 425, a natural language generator (NLG) module 427, and/or a text to speech module (TTS) module 429.

According to an embodiment, the ASR module 421 may convert the voice input received from the user terminal 301 into text data. According to an embodiment, the NLU module 423 may interpret an intent of the user, using the text data of the voice input. For example, the NLU module 423 may interpret the intent of the user by performing syntactic analysis or semantic analysis. According to an embodiment, the NLU module 423 may interpret the meaning of words extracted from the voice input by using linguistic features (e.g., syntactic elements) such as morphemes or phrases and may determine the intent of the user by matching the interpreted meaning of the words to the intent.

According to an embodiment, the planner module 425 may generate a plan using a parameter and the intent that is determined by the NLU module 423. According to an embodiment, the planner module 425 may determine a plurality of domains utilized to perform a task, based on the determined intent. The planner module 425 may determine a plurality of actions included in each of the plurality of domains determined based on the intent. According to an embodiment, the planner module 425 may determine a parameter utilized to perform the determined plurality of actions or a result value output by the execution of the plurality of actions. The parameter and the result value may be defined as a concept of a specified form (e.g., a class). As such, the plan may include the plurality of actions and/or a plurality of concepts, which are determined by the intent of the user. The planner module 425 may determine the relationship between the plurality of actions and the plurality of concepts stepwise (or hierarchically). For example, the planner module 425 may determine the execution sequence of the plurality of actions, which are determined based on the user's intent, based on the plurality of concepts. In other words, the planner module 425 may determine an execution sequence of the plurality of actions, based on the parameters utilized to perform the plurality of actions and the result output by the execution of the plurality of actions. Accordingly, the planner module 425 may generate a plan including information (e.g., ontology) about the relationship between the plurality of actions and the plurality of concepts. The planner module 425 may generate the plan by using information stored in the capsule DB 430 storing a set of relationships between concepts and actions.

According to an embodiment, the NLG module 427 may convert speech into a text format. The information changed to the text form may be in the form of a natural language speech. The TTS module 429 according to an embodiment may change information in the text form to information in a voice form.

According to an embodiment, all or part of the functions of the natural language platform 420 may be also implemented in the user terminal 301.

The capsule DB 430 may store relationship between the actions and the plurality of concepts corresponding to a plurality of domains. According to an embodiment, the capsule may include a plurality of action objects (or action information) and concept objects (or concept information) included in the plan. According to an embodiment, the capsule DB 430 may store the plurality of capsules in a form of a concept action network (CAN). According to an embodiment, the plurality of capsules may be stored in the function registry included in the capsule DB 430.

The capsule DB 430 may include a strategy registry that stores strategy information utilized to determine a plan corresponding to a voice input. When there are a plurality of plans corresponding to the voice input, the strategy information may include reference information for determining one plan. According to an embodiment, the capsule DB 430 may include a follow-up registry that stores information of the follow-up action for suggesting a follow-up action to the user in a specified context. For example, the follow-up action may include a follow-up utterance. According to an embodiment, the capsule DB 430 may include a layout registry storing layout information of information output via the user terminal 301. According to an embodiment, the capsule DB 430 may include a vocabulary registry storing vocabulary information included in capsule information. According to an embodiment, the capsule DB 430 may include a dialog registry storing information about dialog (or interaction) with the user. The capsule DB 430 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 430 according to an embodiment may be also implemented in the user terminal 301.

According to an embodiment, the execution engine 440 may calculate a result by using the generated plan. The end-user interface 450 may transmit the calculated result to the user terminal 301. Accordingly, the user terminal 301 may receive the result and may provide the user with the received result. According to an embodiment, the management platform 460 may manage information used by the intelligence server 400. According to an embodiment, the big data platform 470 may collect data of the user. According to an embodiment, the analytic platform 480 may manage quality of service (QoS) of the intelligence server 400. For example, the analytic platform 480 may manage the component and processing speed (or efficiency) of the intelligence server 400.

According to an embodiment, the service server 500 may provide the user terminal 301 with a specified service (e.g., ordering food or booking a hotel). According to an embodiment, the service server 500 may be a server operated by the third party. According to an embodiment, the service server 500 may provide the intelligence server 400 with information for generating a plan corresponding to the received voice input. The provided information may be stored in the capsule DB 430. Furthermore, the service server 500 may provide the intelligence server 400 with result information according to the plan.

In the above-described integrated intelligence system, the user terminal 301 may provide the user with various intelligence services in response to a user input. The user input may include, for example, an input through a physical button, a touch input, or a voice input.

According to an embodiment, the user terminal 301 may provide a speech recognition service via an intelligence app (or a speech recognition app) stored therein. In this case, for example, the user terminal 301 may recognize a user utterance or a voice input, which is received via the microphone, and may provide the user with a service corresponding to the recognized voice input.

According to an embodiment, the user terminal 301 may perform a specified action, based on the received voice input, independently, or together with the intelligence server and/or the service server. For example, the user terminal 301 may launch an app corresponding to the received voice input and may perform the specified action via the executed app.

In an embodiment, when providing a service together with the intelligence server 400 and/or the service server, the user terminal 301 may detect a user utterance by using the microphone 370 and may generate a signal (or voice data) corresponding to the detected user utterance. The user terminal may transmit the voice data to the intelligence server 400 by using the communication interface 390.

According to an embodiment, the intelligence server 400 may generate a plan for performing a task corresponding to the voice input or the result of performing an action depending on the plan, as a response to the voice input received from the user terminal 301. For example, the plan may include a plurality of actions for performing the task corresponding to the voice input of the user and/or a plurality of concepts associated with the plurality of actions. The concept may define a parameter to be entered upon executing the plurality of actions or a result value output by the execution of the plurality of actions. The plan may include relationship information between the plurality of actions and/or the plurality of concepts.

According to an embodiment, the user terminal 301 may receive the response by using the communication interface 390. The user terminal 301 may output the voice signal generated in the user terminal 301 to the outside by using the speaker 355 or may output an image generated in the user terminal 301 to the outside by using the display 360.

Figure 4:
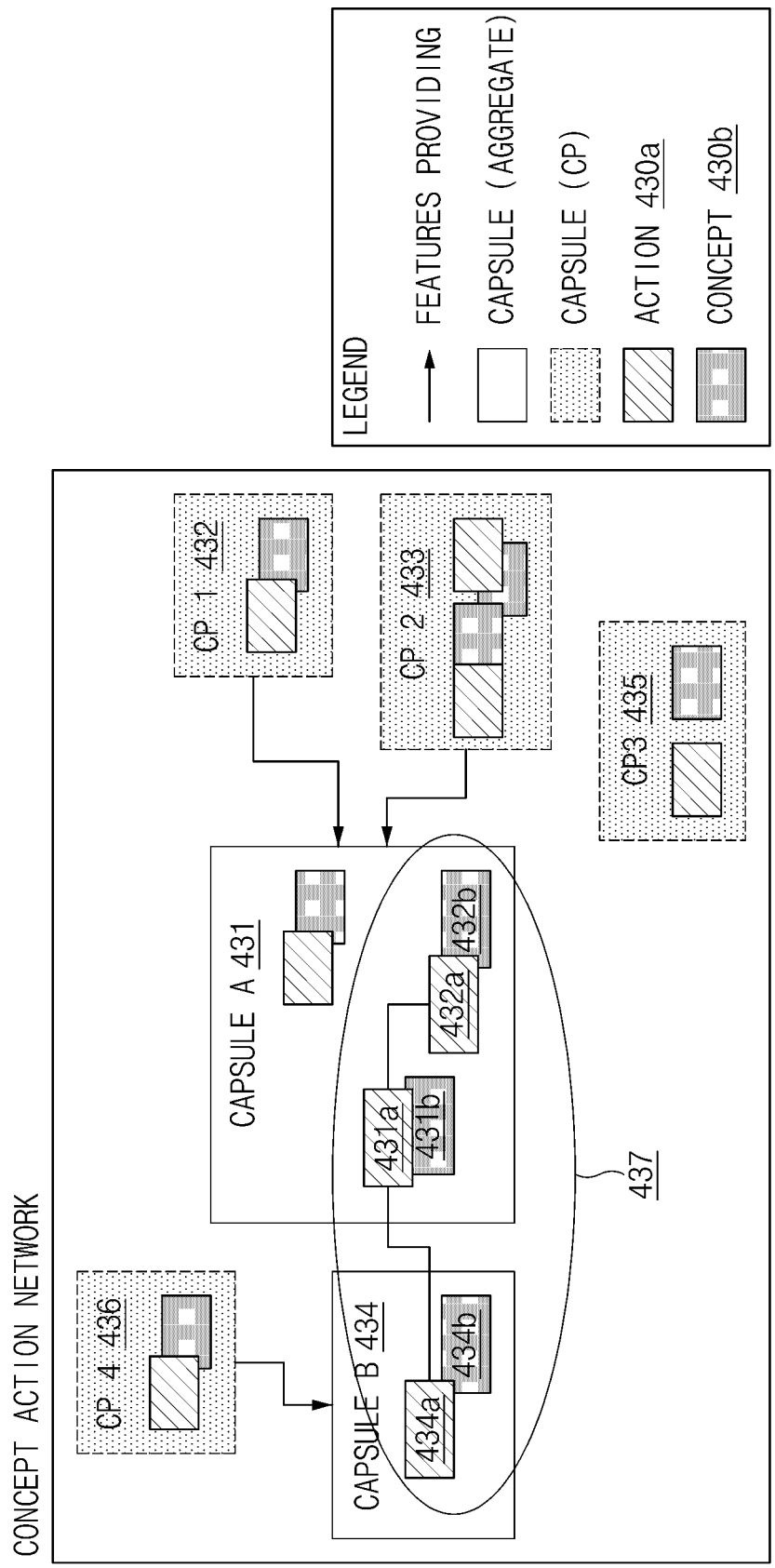
FIG. 4 is a diagram illustrating the form in which relationship information between a concept and an action is stored in a database, according to an embodiment.

FIG. 4 is a diagram illustrating a form in which relationship information between a concept and an action is stored in a database, according to certain embodiments.

A capsule database (e.g., the capsule DB 430) of the intelligence server 400 may store a capsule in the form of a CAN. The capsule DB may store an action for processing a task corresponding to a user's voice input and a parameter utilized for the action, in the CAN form.

The capsule DB may store a plurality capsules (a capsule A 431 and a capsule B 434) respectively corresponding to a plurality of domains (e.g., applications). According to an embodiment, a single capsule (e.g., the capsule A 431) may correspond to a single domain (e.g., a location (geo) or an application). Furthermore, at least one service provider (e.g., CP 1 432 or CP 2 433) for performing a function for a domain associated with the capsule may correspond to one capsule. According to an embodiment, the one capsule may include at least one or more actions 430*a* and at least one or more concepts 430*b* for performing a specified function.

The natural language platform 420 may generate a plan for performing a task corresponding to the received voice input, using the capsule stored in a capsule database. For example, the planner module 425 of the natural language platform may generate the plan by using the capsule stored in the capsule database. For example, a plan 437 may be generated by using actions 431*a* and 432*a* and concepts 431b and 432b of the capsule A 431 and an action 434a and a concept 434b of the capsule B 434.

Figure 5:
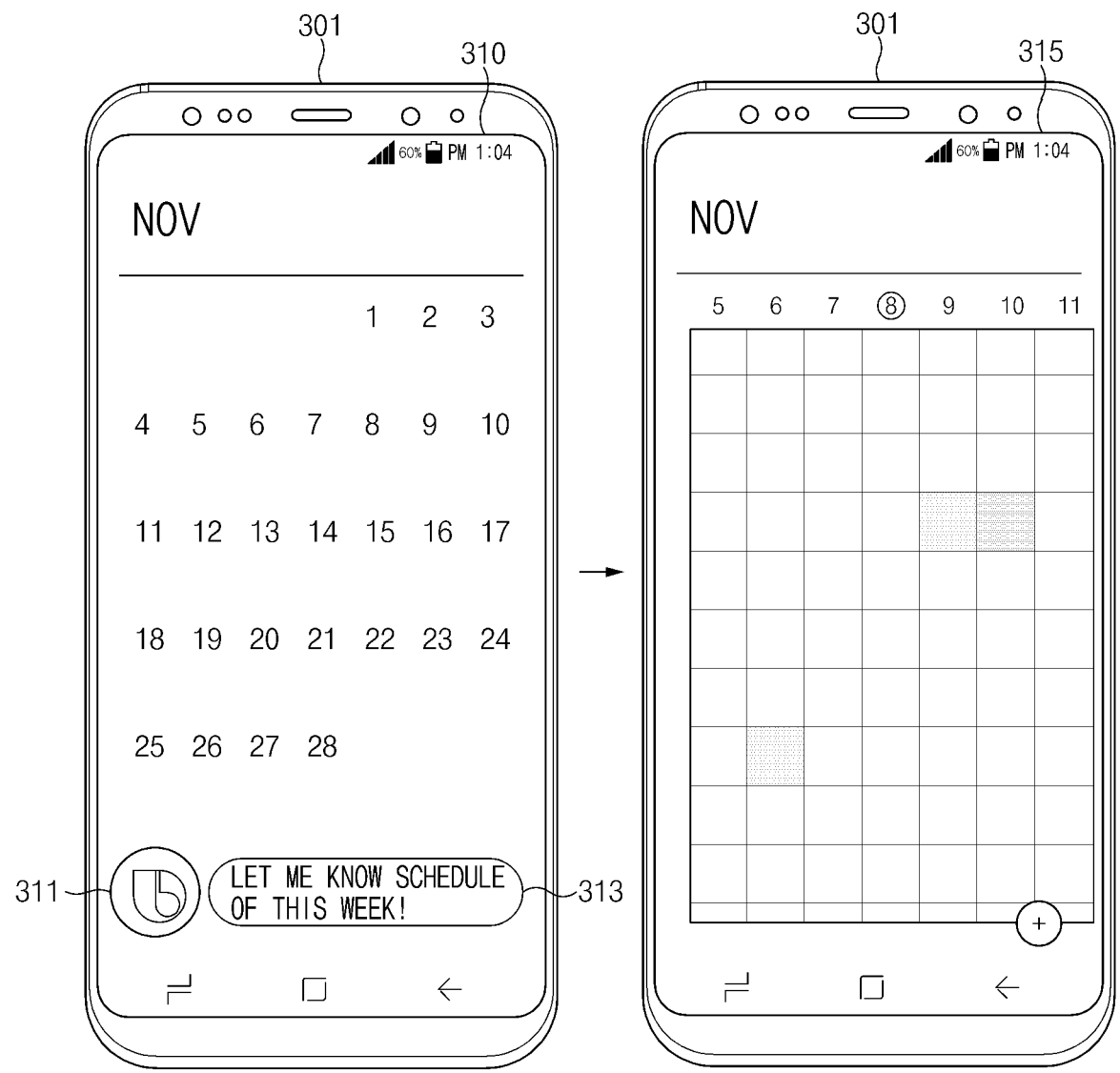
FIG. 5 is a view illustrating a user terminal displaying a screen of processing a voice input received through an intelligence app, according to an embodiment.

FIG. 5 is a view illustrating a screen in which a user terminal processes a voice input received through an intelligence app, according to certain embodiments.

The user terminal 301 may execute an intelligence app to process a user input through the intelligence server 400.

According to an embodiment, on screen 310, when recognizing a specified voice input (e.g., wake up!) or receiving an input via a hardware key (e.g., a dedicated hardware key), the user terminal 301 may launch an intelligence app for processing a voice input. For example, the user terminal 301 may launch the intelligence app in a state where a scheduler app is executed. According to an embodiment, the user terminal 301 may display an object (e.g., an icon) 311 corresponding to the intelligence app, on the display 360. According to an embodiment, the user terminal 301 may receive a voice input by a user utterance. For example, the user terminal 301 may receive a voice input saying, "Let me know schedule of this week!". According to an embodiment, the user terminal 301 may display a user interface (UI) 313 (e.g., an input window) of the intelligence app including text data of the received voice input on a display.

According to an embodiment, on screen 315, the user terminal 301 may display a result corresponding to the received voice input, on the display. For example, the user terminal 301 may receive a plan (e.g., an AI-generated plan) corresponding to the received user input, and may display a present week's schedule on the display according the plan.

In an embodiment, the user terminal 301 of FIGS. 3, 4, and 5 may correspond to the electronic device 101 of FIG. 1. In an embodiment, the intelligence server 400 of FIG. 3 may correspond to one of the electronic device 104 and the server 108 of FIG. 1. In an embodiment, the processor 320 of FIG. 3 may correspond to the processor 120 of FIG. 1; the display 360 of FIG. 3 may correspond to the display device 160 of FIG. 1; and, the speaker 355 of FIG. 3 may correspond to the sound output device 155 of FIG. 1.

Figure 6:
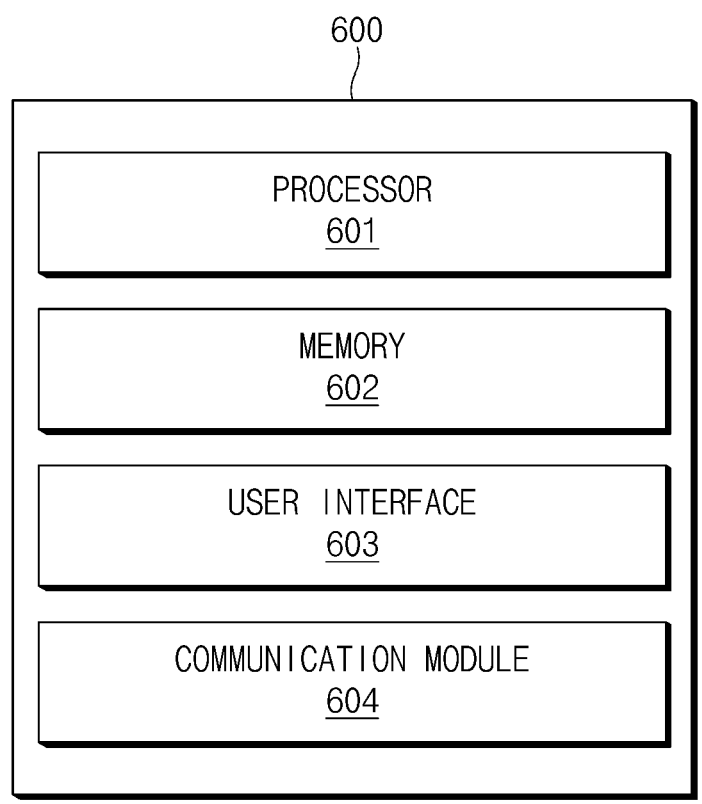
FIG. 6 is a block diagram illustrating a structure of an electronic device, according to an embodiment disclosed in the disclosure.

FIG. 6 is a block diagram illustrating a structure of an electronic device 600, according to an embodiment disclosed in the disclosure. For clarity of description, descriptions the same as the above-mentioned descriptions may be briefly described or omitted.

Referring to FIG. 6, the electronic device 600 may include a processor 601 (e.g., the processor 320 of FIG. 3 and/or the processor 120 of FIG. 1), a memory 602 (e.g., the memory 130 of FIG. 1), a user interface 603, and a communication module 604 (e.g., the communication module 190 of FIG. 1). The user interface 603 may include a microphone (not illustrated) (e.g., the microphone 370 of FIG. 3 and/or the input device 150 of FIG. 1) and a speaker (not illustrated) (e.g., the speaker 355 of FIG. 3 and/or the sound output device 155 of FIG. 1).

The electronic device 600 may further include at least one of additional components in addition to the components illustrated in FIG. 6. According to an embodiment, the components of the electronic device 600 may be the same entities or may include separate entities.

For example, the electronic device 600 may include a smartphone, a tablet PC, a wearable device, a home appliance, or a digital camera. According to an embodiment, the processor 601 may be operatively coupled to the communication module 604, the memory 602, and the user interface 603 (e.g., a microphone (not illustrated) and a speaker (not illustrated)) to perform overall functions of the electronic device 600. For example, the processor 601 may include one or more processors. For example, the one or more processors may include an image signal processor (ISP), an application processor (AP), or a communication processor (CP).

Figure 7A:
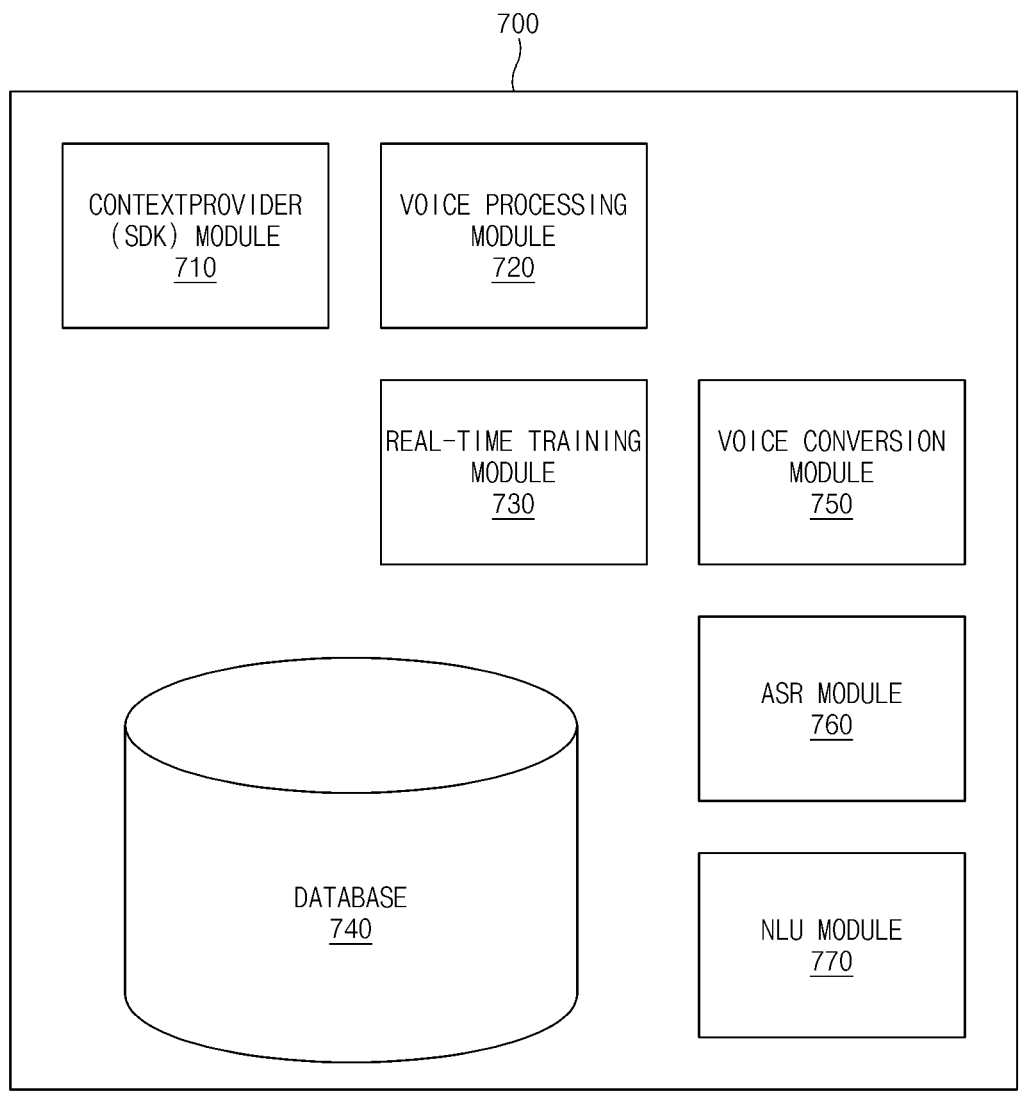
FIG. 7A is another block diagram illustrating a structure of an electronic device, according to an embodiment disclosed in the disclosure.

Furthermore, the processor 601 may drive modules (e.g., a context provider module (ContextProvider(SDK)) 710, a voice processing module 720, a real-time learning module 730, a voice conversion module 750, an ASR module 760 and/or an NLU module 770 in FIG. 7A) by executing instructions stored in the memory 602.

The processor 601 may be operatively connected to the modules (e.g., the context provider module (ContextProvider(SDK)) 710, the voice processing module 720, the real-time learning module 730, the voice conversion module 750, the ASR module 760 and/or the NLU module 770 in FIG. 7A) to perform overall functions of the electronic device 600. In the embodiment disclosed in this disclosure, it may be understood that an operation performed (or executed) by the modules (e.g., the context provider module (ContextProvider(SDK)) 710, the voice processing module 720, the real-time learning module 730, the voice conversion module 750, the ASR module 760 and/or the NLU module 770 in FIG. 7A) is an operation performed by the processor 601 executing instructions stored in the memory 602.

In an embodiment, the processor 601 may include the modules (e.g., the context provider module (ContextProvider(SDK)) 710, the voice processing module 720, the real-time learning module 730, the voice conversion module 750, the ASR module 760 and/or the NLU module 770 in FIG. 7A). In this case, an operation performed (or executed) by each module (e.g., the context provider module (ContextProvider(SDK)) 710, the voice processing module 720, the real-time learning module 730, the voice conversion module 750, the ASR module 760 and/or the NLU module 770 in FIG. 7A) may be implemented as at least part of the processor 601.

Several modules described in certain embodiments of the disclosure may be implemented by hardware, software, or a combination of hardware and software.

The memory 602 may store a database (not illustrated) (e.g., the database 740 of FIG. 7A) including at least one input data. The memory 602 may store commands, information, or data associated with operations of components included in the electronic device 600. For example, the memory 602 may store instructions, when executed, that cause the processor 601 to perform various operations described in the disclosure.

In an embodiment, the electronic device 600 may receive a user input by using the user interface 603. The user input may be an input including a user voice signal (e.g., a user's utterance input).

In an embodiment, the user input may be the user's voice input (e.g., an utterance). When the user input is a voice input, the electronic device 600 may receive a user input through a microphone (or a voice receiving device) (not illustrated).

In an embodiment, the user input may be a gesture input and/or a touch input. When the user input is a gesture input and/or a touch input, the electronic device 600 may receive a user input through a sensor (not illustrated).

According to an embodiment, the processor 601 may include a sound module (not illustrated). Hereinafter, the operation performed by the sound module may be performed by the processor 601 using the sound model stored in the memory 602 or in an external device communicatively connected to the electronic device 600. The sound module may recognize a user input for executing an operation. For example, the sound module may recognize and receive the voice signal. For example, the sound module recognizing the user input may have a high speech recognition rate because ambient noise is strong.

According to an embodiment, the sound module may be learned to recognize and receive the user input by using an algorithm for recognizing a voice. For example, the algorithm for recognizing the voice may be at least one of a hidden Markov model (HMM) algorithm, an artificial neural network (ANN) algorithm, and a dynamic time warping (DTW) algorithm.

According to an embodiment, the sound module may perform tasks of data refinement, data integration, data reduction, and/or data conversion. The data refinement may include an operation of filling in incomplete data and correcting inconsistent data. The data integration may include an operation of merging various divided databases and files for easy analysis. The data reduction may include an operation of sampling some of input data or reducing the dimension of data to be analyzed. The data conversion may include an operation of normalizing or grouping data by obtaining an average value of the data. The sound module may process data, thereby preventing meaningless values from being included in data or preventing data quality from being degraded due to unintended variables. Accuracy and timeliness may be increased through the sound module.

In an embodiment, at least one operation among operations of each component described with reference to the electronic device 600 may be performed (or executed) by an external server (not illustrated) or another electronic device (not illustrated). For example, the processor 601 may transmit a user input to the external server (not illustrated) or the other electronic device (not illustrated) by using the communication module 604.

A processor (not illustrated) included in an external server (not illustrated) or the other electronic device (not illustrated) may receive the user input, may generate response data, and may transmit the response data to the electronic device 600.

The processor 601 may receive the response data corresponding to the user input from the external server (not illustrated) or the other electronic device (not illustrated) through the communication module 604. When receiving the response data, the processor 601 may allow the response data to be output through the user interface 603. Alternatively, through the communication module 604, other devices may be controlled or data may be stored. The processor 601 may include at least one or more processors, and may be driven while being physically divided into a main processor performing high-performance processing and an auxiliary processor performing low-power processing. Alternatively, one processor may process data by switching between a high performance mode and a low power mode depending on situations.

Hereinafter, an operation of the processor 601 will be described in detail.

According to an embodiment, the memory 602 may store instructions that, when executed, cause the processor 601 to extract at least one piece of context information based at least in part on an application screen displayed on the display, to analyze the extracted at least one piece of context information to generate a language model based on the extracted at least one piece of context information, to receive a voice input of a user through a user interface 603 (e.g., input circuitry) and convert the voice input into a text string using the generated language model, and to reset the generated language model.

According to an embodiment, the memory 602 may store instructions that, when executed, cause the processor 601 to extract a voice signal from the user input of the user using a sound model stored in memory 602 and operatively connected to the processor 601 and to train the sound model using a learning algorithm.

According to an embodiment, the extracted at least one piece of context information includes one or more of words, phrases and sentences, and the memory 602 may store instructions that, when executed, cause the processor 601 to further detect one or more related words, phrases and sentences having a threshold similarity to the one or more words, phrases and sentences of the extracted at least one piece of context information. The one or more words, phrases and sentences, and the one or more related words, phrases and sentences are embedded into numeric vectors for comparison to detect the threshold similarity.

According to an embodiment, the memory 602 may store instructions that, when executed, cause the processor 601 to convert the received voice input of the user into a text string, including adjusting respective weights of the generated language model and another language model, and the another language model is stored in the locally memory, or stored on an external device communicatively connected with the electronic device.

According to an embodiment, the memory 602 may store instructions that, when executed, cause the processor 601 to generate at least one grapheme string, including decomposing, in real-time, information included in the extracted at least one piece of context information based on a grapheme string, and the language model is generated based on a statistical value associated with a usage frequency of the grapheme string.

According to an embodiment, the memory 602 may store instructions that, when executed, cause the processor 601 to convert the extracted at least one piece of context information in a form of a text array, to execute artificial intelligence (AI) training on the generated language model using the extracted at least one piece of context information, and based on the AI training, store the text array in which one or more of words, phrases and sentences included in the extracted at least one piece of context information are categorized by semantic unit. The voice input is converted in to the text string by comparing entries in the stored text array to information included in the voice input.

According to an embodiment, the memory 602 may store instructions that, when executed, cause the processor 601 to reset the generated language model, based on detecting a change in at least part of the screen displayed on the display.

According to an embodiment, the memory 602 may store instructions that, when executed, cause the processor 601 to execute AI training on the generated language model separately from another language model, and the another language model is stored locally in the memory 602, or stored in an external device communicatively connected with the electronic device 600.

According to an embodiment, the memory 602 may store instructions that, when executed, cause the processor 601 to display, on the display, the text string into which the voice input is converted.

According to an embodiment, the memory 602 may store instructions that, when executed, cause the processor 601 to identify a grapheme string included in the extracted at least one piece of context information using at least a morpheme analysis.

FIG. 7A is another block diagram illustrating a structure of an electronic device 700, according to an embodiment disclosed in the disclosure. For clarity of description, descriptions the same as the above-mentioned descriptions may be briefly described or omitted.

According to an embodiment that is illustrated, the electronic device 700 may include a context provider module (i.e., ContextProvider(SDK)) 710, a voice processing module 720, a real-time training module 730, a database 740, a voice conversion module 750, an ASR module 760 and/or an NLU module 770. The listed components may be operatively or electrically connected to one another.

The voice processing module 720, the real-time training module 730, the voice conversion module 750, and the ASR module 760 are separately illustrated in FIG. 7A. However, embodiments are not limited thereto. For example, the voice processing module 720, the real-time training module 730, and the voice conversion module 750 may be included in the ASR module 760. Alternatively, the voice processing module 720 and the real-time training module 730 may be present separately, and the voice conversion module 750 may be included in the ASR module 760.

The context provider module (ContextProvider(SDK)) 710 may extract and/or provide information displayed through a display, which is included in or operatively connected to the electronic device 700. For example, when a gallery application is displayed on the display, the context provider module (ContextProvider(SDK)) 710 may extract text information such as an album name and/or a file name of a photo, which is displayed through the gallery application, and may provide the extracted information to another module (e.g., the voice processing module 720).

In an embodiment, although information is not displayed through the display, the context provider module (ContextProvider(SDK)) 710 may extract the information about the displayed content and may provide the extracted information to another module (e.g., the voice processing module 720). For example, when the gallery application is displayed on the display, although information is not displayed through the display, the context provider module (ContextProvider(SDK)) 710 may extract the information (e.g., a capture time, a capture location, and a shooting mode, which are included in a JPEG header) about a point in time when a photo included in the gallery application is captured and may provide the extracted information to the other module.

As another example, when the music application is displayed on the display, although information is not displayed through the display, the context provider module (ContextProvider(SDK)) 710 may extract the information (e.g., a composer's name, a lyricist's name, or an album including the song) about the displayed song as well as the title of a song displayed on the display and then may provide the extracted information to the other module.

In an embodiment, the context provider module (ContextProvider(SDK)) 710 may provide the extracted information to the other module (e.g., the voice processing module 720) in a form of a text array.

In an embodiment, the context provider module (ContextProvider(SDK)) 710 may convert not only a text but also an image (e.g., a form of a byte array) and may provide the converted result to the other module (e.g., the voice processing module 720).

In an embodiment, the context provider module (ContextProvider(SDK)) 710 may provide the extracted information in a form of a text array to the voice processing module 720 so as to synchronize the extracted information with the ASR module 760.

The context provider module (ContextProvider(SDK)) 710 is separately illustrated in FIG. 7A. However, this is an example. Embodiments may not be limited thereto. For example, a context provider module (ContextProvider (SDK)) may be included in an application.

The voice processing module 720 may deliver the information received from the context provider module (ContextProvider(SDK)) 710 to the ASR module 760. In an embodiment, the voice processing module 720 may mean an intelligence application (or a voice agent) that provides a voice recognition service.

FIG. 7A illustrates that the real-time training module 730 and the voice conversion module 750 are separately from the ASR module 760. However, the ASR module 760 may include the real-time training module 730 and the voice conversion module 750.

The voice conversion module 750 may convert data received from the voice processing module 720 into text data. For example, the voice conversion module 750 may convert audio data received from the voice processing module 720 into text data. The voice conversion module 750 may compare the converted text data with a language model and then may select data most similar to utterance context of a user from the language model. For example, when the utterance content of the user is "emotions such as joy, anger, sorrow, and pleasure", the voice conversion module 750 may select "emotion_joy, anger, sorrow, and pleasure_operation" as the most similar data from the language model.

The real-time training module 730 may train information received from the voice processing module 720 so as to be used for speech recognition using the ASR module 760. In an embodiment, the real-time training module 730 may generate a second language model in real time based on context information extracted and/or provided by the context provider module (ContextProvider (SDK)) 710. For example, the second language model may be a statistical language model (SLM).

In an embodiment, the real-time training module 730 may use the second language model thus generated in real time and then may reset (or refresh) the second language model.

For example, when at least part of the screen displayed through the display of the electronic device 700 is changed, the context provider module (ContextProvider(SDK)) 710 may change at least part of information extracted from the screen. When at least part of the information received from the context provider module (ContextProvider(SDK)) 710 is changed, the real-time training module 730 may reset (or refresh) the real-time generated second language model and then may regenerate the second language model.

In an embodiment, at least part of a screen displayed through the display of the electronic device 700 may be changed. When at least part of the screen is included in at least one screen provided by an application (or domain) belonging to the same or similar category, the real-time training module 730 may update and reuse the second language model.

Figure 7B:
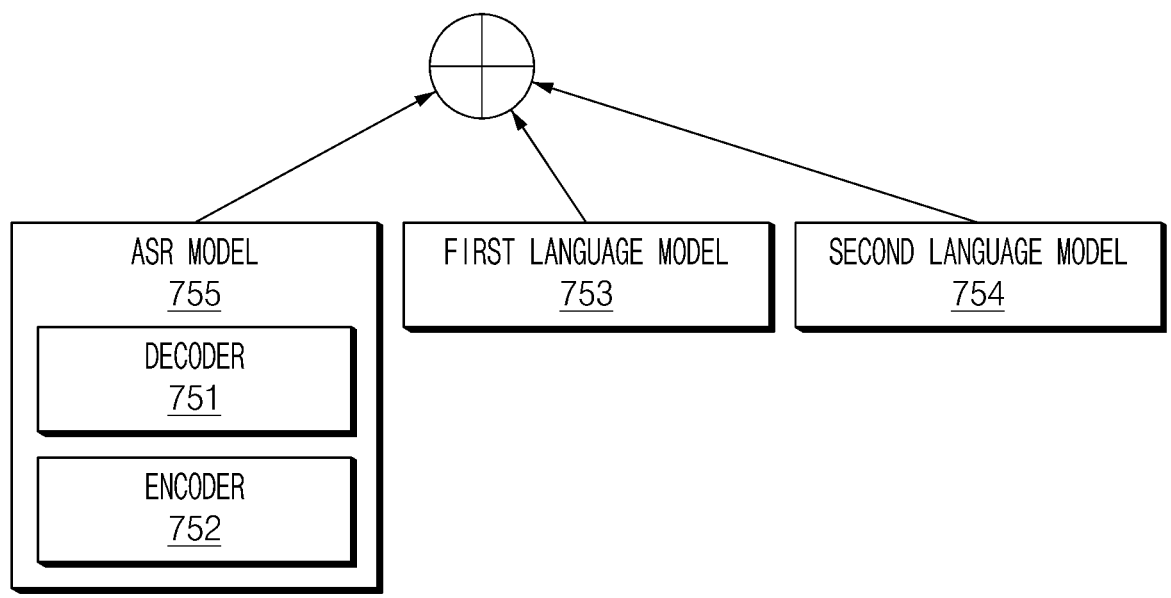
FIG. 7B is a block diagram illustrating a structure of a voice conversion module, according to an embodiment disclosed in the disclosure.

Hereinafter, the voice conversion module 750 will be described in detail with reference to FIG. 7B. FIG. 7B is a block diagram illustrating a structure of a voice conversion module, according to an embodiment. As illustrated in FIG. 7B, the voice conversion module 750 may include an ASR model 755, a first language model 753, and/or a second language model 754.

In an embodiment, the ASR model 755 and the first language model 753 may be models based on a neural network structure. The neural network structure may be a model implemented as hardware, software, or a combination of at least a piece of hardware and at least a piece of software, which performs computational and data processing functions using a plurality of artificial nodes. For example, the neural network structure may be a model implemented by a deep neural network (DNN) or a bidirectional long short term memory (BLSTM).

In an embodiment, the second language model 754 may be an SLM based on statistical values according to the frequency of a grapheme string. In an embodiment, the second language model 754 may be generated and/or trained by the real-time training module 730.

In an embodiment, the ASR model 755 may mean a model designed to output text data based on a voice signal obtained from the outside (e.g., a user). For example, the ASR model 755 may recognize a voice signal obtained from a user in units of phonemes. For example, the ASR model 755 may include an encoder 752 and a decoder 751. The ASR model 755 may be operatively connected to the first language model 753 and the second language model 754 so as to output text data.

The ASR model 755 may include an encoder(752)-decoder(751) structure. The encoder(752)-decoder(751) structure may mean a structure that compresses an input sequence into a single vector having a fixed size through the encoder 752 and outputs the single vector having a fixed size as an output sequence through the decoder 751.

In an embodiment, the first language model 753 may indicate a model designed to obtain probability information based on a connection relationship between a plurality of words. The first language model 753 and the second language model 754 may provide probability information about the next word to be connected to a word entered into each language model. The voice conversion module 750 may select a connection relationship between words having the highest probability based on the probability information generated by using the ASR model 755, the first language model 753, and the second language model 754, and may output result data based on the selected connection relationship as a result of speech recognition.

In an embodiment, the voice conversion module 750 may generate the final speech recognition result for information (e.g., a voice signal obtained from an external (e.g., user) and context information extracted and/or provided by the context provider module (ContextProvider(SDK)) 710) received from the voice processing module 720 by using the ASR model 755, the first language model 753, and the second language model 754. For example, the ASR model 755 may generate candidates (e.g., output data of the decoder 751) of data to be output based on encoded result data (e.g., output data of the encoder 752) and a previously-determined recognition result ($y_{t-1}$). The first language model 753 and the second language model 754 may generate the candidates of data to be output based on the previously-determined recognition result.

In an embodiment, the electronic device 700 may generate the final voice recognition result by calculating pieces of output data derived from each of models (e.g., the first language model 753 and the second language model 754) depending on a specified weight.

FIG. 7B illustrates that the ASR model 755, the first language model 753, or the second language model 754 is implemented as a separate component, but is not limited thereto. For example, the first language model 753 and/or the second language model 754 may be designed to be included in the ASR model 755.

In an embodiment, the voice conversion module 750 may output ASR data (e.g., text data corresponding to a voice recognition output result) by using a method of scoring the first language model 753 (e.g., neural network language model (NNLM)) and the second language model 754 (e.g., statistical language model (SLM)). For example, the voice conversion module 750 may score the first language model 753 (NNLM) and the second language model (SLM) by using a shallow fusion method using two different models. In an embodiment, the voice conversion module 750 may linearly combine probability values of data output from the first language model 753 (NNLM) and the second language model (SLM) with respect to the information received from the voice processing module 720. As a result, the voice conversion module 750 may combine the probability values of data in a manner of selecting a value (e.g., a grapheme) with high probability.

In an embodiment, the real-time training module 730 may decompose the provided text (e.g., a context sentence extracted by the context provider module (ContextProvider (SDK)) 710) based on a grapheme in real time, and then generate a second language model (e.g., SLM) based on statistical values according to the frequency of a grapheme string. For example, when receiving a text of '방탄티끄이', the real-time training module 730 may decompose '방탄티끄이' into '바ㅇ', '타ㄴ', and '니ㅂ이_' based on a grapheme. The real-time training module 730 may generate SLM based on statistical values according to the frequency of the decomposed '바ㅇ', '타ㄴ', or '니ㅂ이_'.

In an embodiment, the voice conversion module 750 may generate the final voice recognition result by calculating data output for each language model depending on a specified weight. For example, the voice conversion module 750 may recognize a normal text and a text associated with the provided context information. The voice conversion module 750 may adjust a weight of the output data of the second language model so as to be higher than a weight of the output data of the first language model (NNLM) such that the text associated with the provided context information is more easily perceived. The normal text may be a text stored in the first language model. For example, when a music application is running on the electronic device 700 and the content of 'Singer—Gildong Hong, Title—Korean song top 10' is displayed on the display of the electronic device 700, "play top ten Songs of Hong Gil-dong" may be received as a user utterance. In an embodiment, 'Korean song top 10' may be present in the first language model, and the provided context information may include top 10 songs. The real-time training module 730 may adjust a weight so as to give a higher priority to 'Korean song top 10' included in the context information than 'Korean song top 10' included in the first language model.

In an embodiment, the real-time training module 730 may find and train words and/or phrases having a high similarity with words, phrases and/or sentences included in the provided information. In an embodiment, the real-time training module 730 may embed words, phrases, and/or sentences included in the provided information and may find and train words and/or phrases having the highest similarity in a dictionary. The embedding may refer to a scheme of expressing string data as a numeric vector. For example, the real-time training module 730 may find words and/or phrases having high similarity by using word embedding of expressing a word included in an utterance set as a dense vector.

The ASR module 760 may convert the received user input into text data by using the generated language model. For example, the ASR module 760 may convert the received voice data into text data. It is illustrated that the ASR module 760 is included in the electronic device 700 in FIG. 7A. However, the ASR module 760 may be included in an external device (e.g., server) operatively connected to the electronic device 700.

The NLU module 770 may interpret the user's intent by performing syntactic analysis or semantic analysis. According to an embodiment, the NLU module 770 may interpret the meaning of words extracted from the voice input by using linguistic features (e.g., syntactic elements) such as morphemes or phrases and may determine the intent of the user by matching the interpreted meaning of the words to the intent.

According to an embodiment disclosed in the disclosure, when the user attempts a start utterance (e.g., a wake-up word), the electronic device 700 may extract information, which is displayed on a display included in or operatively connected to the electronic device 700 at a point in time when the electronic device 700 receives the start utterance (e.g., wake-up word), and may use the extracted information to recognize an utterance after the user's start utterance (e.g., a wake-up word). Accordingly, the electronic device 700 may increase the recognition rate of the user's utterance. In an embodiment, when the electronic device 700 receives the start utterance (e.g., a wake-up word), the electronic device 700 may receive a user's voice input by activating the voice processing module 720 (e.g., an intelligence application (or a voice agent)).

According to an embodiment disclosed in the disclosure, the electronic device 700 may display more accurate ASR data (e.g., text data as a result of speech recognition) even when incorrect data (e.g., audio data with incorrect pronunciation) is received, by generating a real-time language model (e.g., a second language model) by using information extracted from a screen.

According to embodiments disclosed in the disclosure, when information that the user has actually intended to utter includes the additional information (e.g., special characters), the electronic device 700 may display ASR data including additional information by generating a real-time language model by using information extracted from a screen and information associated with the extracted information.

Figure 8:
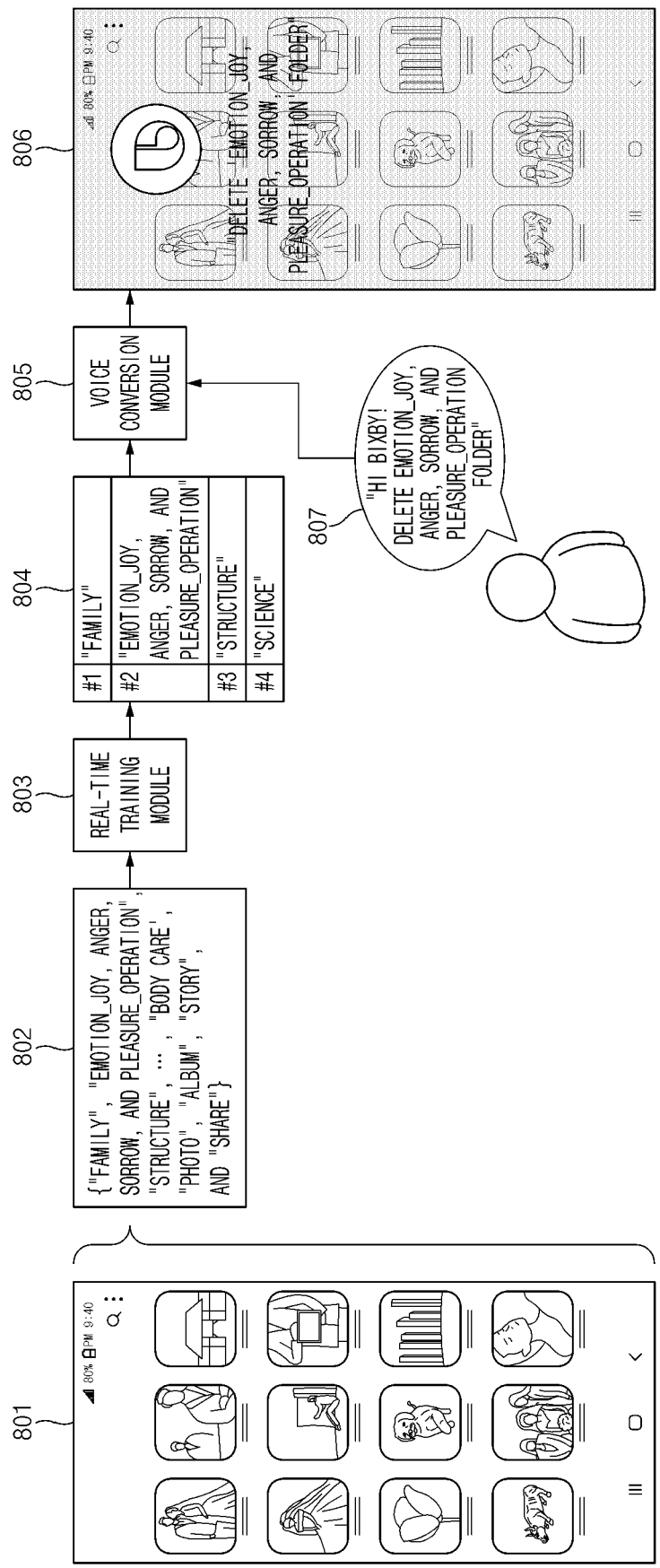
FIG. 8 is an example diagram of a method in which an electronic device converts a user utterance into ASR data, according to an embodiment disclosed in the disclosure.

FIG. 8 is an example diagram of a method in which an electronic device converts a user utterance into ASR data, according to an embodiment disclosed in the disclosure.

Referring to FIG. 8, a first state 801 illustrates that an execution screen of a gallery application is displayed through a display operatively connected to or included in an electronic device (e.g., the user terminal 301 of FIG. 3, the electronic device 600 of FIG. 6, or the electronic device 700 of FIG. 7A). The electronic device (e.g., the ContextProvider (SDK) module 710 of FIG. 7A) may extract text information such as an album name and/or a file name of a photo corresponding to content displayed on a display through the first state 801. Although the extracted information is not displayed through the display, the electronic device (e.g., the ContextProvider(SDK) module 710) may extract the information regarding the displayed content and provide the extracted information. For example, the electronic device (e.g., the ContextProvider(SDK) module 710) may extract information (e.g., a capture time, a capture location, and a shooting mode, which are included in a JPEG header) regarding a date and/or time at which a gallery photo was captured, and then provide the extracted information to a real-time training module 803 (e.g., the real-time training module 730 of FIG. 7A).

In an embodiment, the electronic device (e.g., the ContextProvider(SDK) module 710) may provide the extracted information to another module in a form 802 of a text array. For example, the information extracted from the first state 801 may be provided to the real-time training module 803 in the form 802 of a text array including "family", "emotion_joy, anger, sorrow, and pleasure_operation", "structure", . . . , "body care", "photo", "album", "story", and "share".

The real-time training module 803 may generate and/or train a real-time language model (e.g., second language model (SLM)), to use the received information for speech recognition using the ASR module 760. The real-time training module 803 may train the second language model with respect to information including the received form 802 of a text array and may store a result in units of meanings. For example, as illustrated in the first table 804, data in the form 802 of a text array including "family", "emotion_joy, anger, sorrow, and pleasure_operation", "structure", . . . , "body care", "photo", "album", "story", and "share" may be stored in units of meanings. The real-time training module 803 may store the training result in units of meanings, for future comparisons user utterances.

The real-time training module 803 may decompose the provided text, based on a grapheme in real time and then may generate a second language model based on statistical values according to the frequency of a grapheme string.

In an embodiment, a voice conversion module 805 (e.g., the voice conversion module 750 of FIG. 7A) may adjust a weight for output data derived from the second language model generated in real time by the real-time training module 803 so as to be higher than a weight for output data derived from an ASR model and a first language model, and then may output text data (e.g., ASR data) as a result of speech recognition. For example, the voice conversion module 805 may recognize a normal text and a text associated with the provided context information. The voice conversion module 805 may adjust a weight such that the text associated with the provided context information is more easily perceived.

The voice conversion module 805 may convert a received voice input 807 of the user into text data. FIG. 8 illustrates "Hi Bixby, delete an 'emotion_joy, anger, sorrow, and pleasure_operation' folder" as the voice input 807 of the user. The voice conversion module 805 may convert the received phrase "Hi Bixby, delete an 'emotion_joy, anger, sorrow, and pleasure_operation' folder" into text data.

The electronic device may adjust a weight between languages included in the first language model so as to give priority to "emotion_joy, anger, sorrow, and pleasure_operation" generated by the real-time training module 803.

Referring to a second state 806, the electronic device may display the derived text string, "delete the emotion_joy, anger, sorrow, and pleasure_operation folder" through a display with respect to the voice input 807 of the user.

As illustrated in FIG. 8, according to an embodiment disclosed in the disclosure, the electronic device may display more accurate ASR data even when incorrect data (e.g., audio data with incorrect pronunciation) is received, by generating a real-time language model by using information extracted from a screen.

Figure 9:
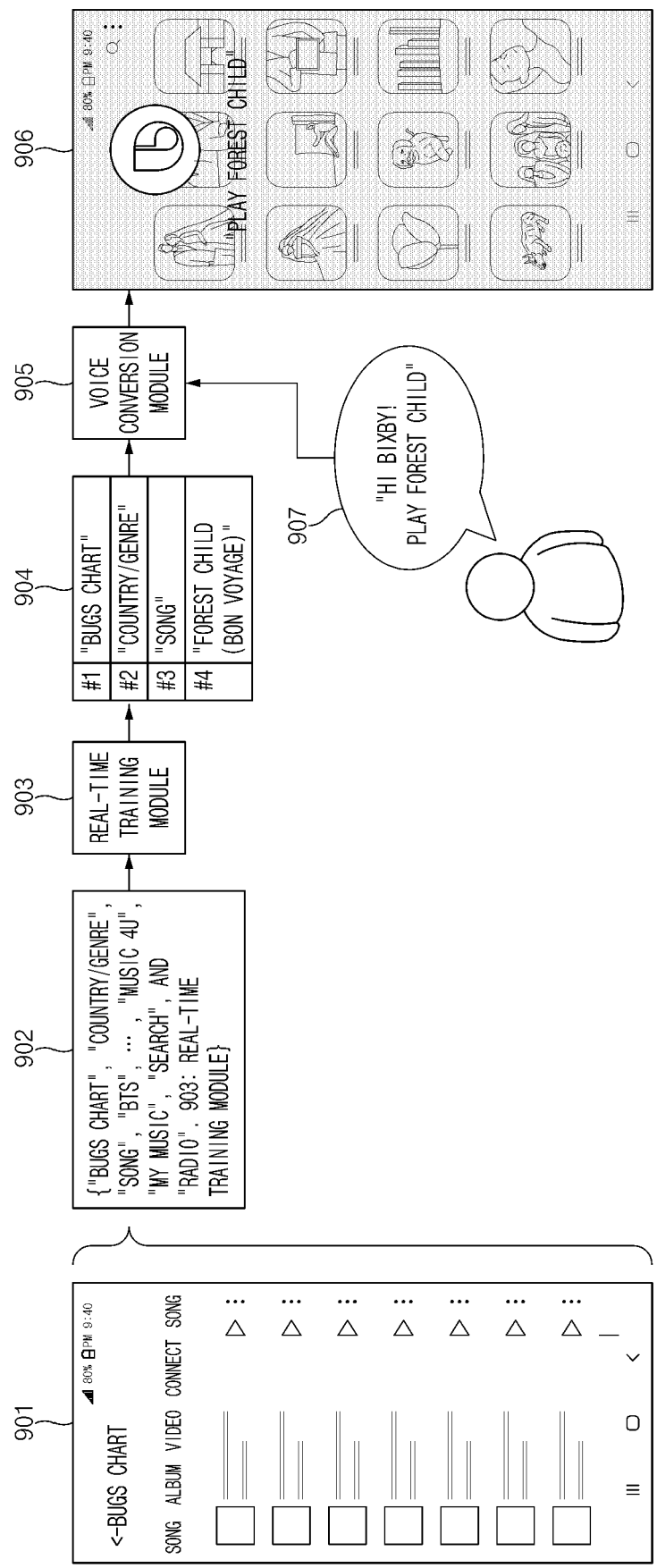
FIG. 9 is another example diagram of a method in which an electronic device converts a user utterance into ASR data, according to an embodiment disclosed in the disclosure.

FIG. 9 is another example diagram of a method in which an electronic device converts a user utterance into ASR data, according to an embodiment disclosed in the disclosure.

Referring to FIG. 9, a first state 901 illustrates that an execution screen of a music application is displayed through a display operatively connected to or included in an electronic device (e.g., the user terminal 301 of FIG. 3, the electronic device 600 of FIG. 6, or the electronic device 700 of FIG. 7A). The electronic device may extract text information such as an album name and/or a file name of a photo displayed on a display through the first state 901. The electronic device may extract the information about the displayed content and may provide the extracted information to a real-time training module 903. Although the extracted information is not displayed through the display, the electronic device may extract the information (e.g., a composer's name, a lyricist's name, or an album including the song) regarding the displayed song, as well as a title of a song displayed on the display, and then provide the extracted information to the real-time training module 903.

The electronic device may provide the extracted information to another module in a form 902 of a text array. For example, the information extracted from the first state 901 may be provided to the real-time training module 903 in the form 902 of a text array including "bugs chart", "country/genre", "song", "BTS", ... , "music 4U", "my music", "search", and "radio".

The real-time training module 903 may generate and/or train a real-time language model (e.g., a second language model) to use the received information for speech recognition using the ASR module. The real-time training module 903 may train the second language model with respect to information including the received text array form 902 and store a result 904, in units of meanings. For example, as illustrated in the first table 904, data in the form 902 of a text array including "bugs chart", "country/genre", "song", "BTS", ... , "music 4U", "my music", "search", and "radio" may be stored in units of meanings. The real-time training module 903 may store the training result in units of meanings, for future comparison of the training result with user utterances.

The real-time training module 903 may decompose the provided text based on a grapheme in real time and then may generate a second language model based on statistical values according to the frequency of a grapheme string. In an embodiment, a voice conversion module 905 (e.g., the voice conversion module 750 of FIG. 7A) may adjust a weight for output data derived from the second language model generated in real time by the real-time training module 903 so as to be higher than a weight for output data derived from an ASR model and a first language model, and then may output text data (e.g., ASR data) as a result of speech recognition. For example, the voice conversion module 905 may recognize a normal text and a text associated with the provided context information. The voice conversion module 805 may adjust a weight such that the text associated with the provided context information is more easily perceived.

The voice conversion module 905 may convert a received voice input 907 of the user into text data. FIG. 9 illustrates the voice input 907, "Hi Bixby, play 'forest child.'". The voice conversion module 905 may thus convert the phrase "Hi Bixby, play 'forest child'" into text data.

The electronic device may adjust a weight between languages included in the first language model so as to give priority to "forest child (Bon voyage)" in Table 1 904, as stored in units of meanings generated by the real-time training module 905.

Referring to a second state 906, the electronic device may display "Hi Bixby, play 'forest child (Bon voyage)'" through a display with respect to the user voice input 907.

According to embodiments disclosed in the disclosure, when information that the user has actually intended to utter includes the additional information (e.g., special characters), the electronic device may display ASR data including additional information (e.g., special characters) by generating a real-time language model by using information extracted from a screen and information associated with the extracted information.

Hereinafter, according to an embodiment disclosed in the disclosure, a method in which an electronic device improves voice recognition performance will be described with reference to FIG. 10.

Figure 10:
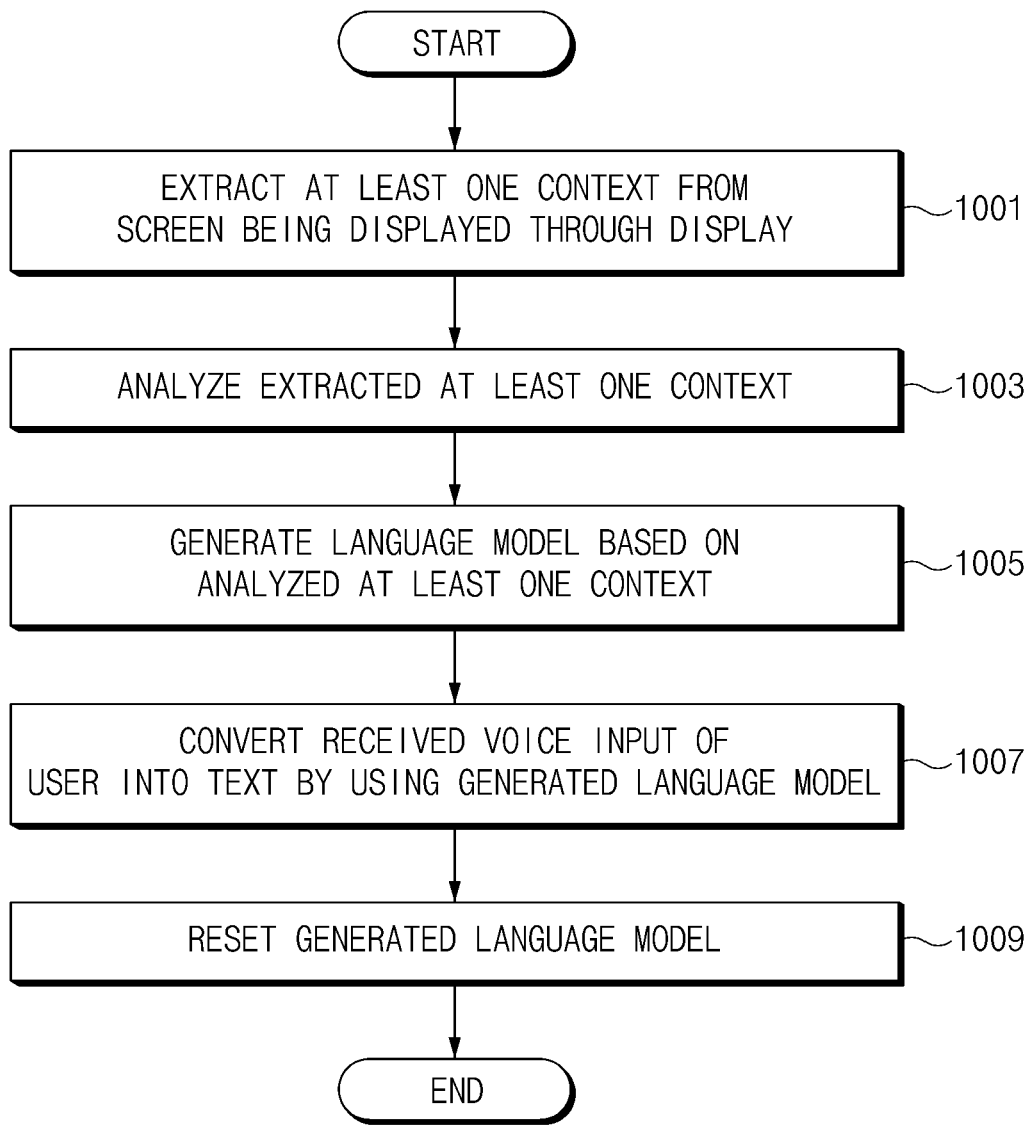
FIG. 10 is a flowchart of a method, in which an electronic device improves voice recognition performance, according to an embodiment disclosed in the disclosure.

FIG. 10 is a flowchart 1000 of a method, in which an electronic device improves voice recognition performance, according to an embodiment disclosed in the disclosure. According to an embodiment, it may be understood that the process illustrated in FIG. 10 is performed by a processor (e.g., the processor 120 of FIG. 1) of an electronic device (e.g., the electronic device 101 of FIG. 1) by executing instructions stored in a memory (e.g., the memory 130 of FIG. 1).

In operation 1001, the electronic device may extract at least one piece of context information, from a screen presently displayed on the display. In an embodiment, the electronic device may extract at least one context using content displayed on the screen being displayed through the display. For example, when a gallery application is displayed on the display, the electronic device may extract text information such as an album name and/or a file name of a photo, which is displayed through the gallery application.

In an embodiment, although the extracted information is not displayed through the display, the electronic device may extract the information about the displayed content. For example, when an execution screen of the gallery application is displayed on the display, although the extracted information is not displayed through the display, the electronic device may extract the information (e.g., a capture time, a capture location, and a shooting mode, which are included in a JPEG header) regarding a date and/or time at which a particular gallery image was captured, and provide the extracted information to another module.

As another example, when an execution screen of the music application is displayed on the display, although information is not displayed through the display, the electronic device may extract the information about a displayed song, such as a composer, lyricist, album to which it belongs, and/or a title of a song as displayed on the display, and then provide the extracted information to the other module.

In operation 1003, the electronic device may analyze the extracted at least one context information. In an embodiment, the electronic device may convert the information about the extracted context into a text array format, and analyze the converted information. In an embodiment, the electronic device may analyze information about the extracted context by converting not only included text information, but also image information as well (e.g., converting an imagine into the form of a byte array).

In an embodiment, the electronic device may identify and analyze words and/or phrases having a high similarity to words, phrases and/or sentences included in the provided context information. In an embodiment, the electronic device may "embed" the words, phrases, and/or sentences included in the provided information, and may search for and train (e.g., via AI modeling) similar words and/or phrases (e.g., from a dictionary) having a sufficient threshold closeness to the embedded words, phrases and sentences. Embedding may refer to a scheme of expressing string data as a numeric vector. For example, the electronic device may identify words and/or phrases with sufficient threshold similarity using word embedding that expresses words included in an utterance set as a dense vector.

In operation 1005, the electronic device may generate a language model based on the analyzed context. The language model may be SLM. The analyzed context may include the converted text data. The electronic device may train the generated language model to use the converted text data for voice recognition using the ASR module.

In an embodiment, the electronic device may include a first language model (e.g., NNLM) and a second language model (e.g., SLM). The generated language model may be a second language model.

In an embodiment, the electronic device may output ASR data (e.g., text data corresponding to a voice recognition output result) by using a method of scoring the first language model (e.g., NNLM) and the second language model (e.g., SLM). For example, the electronic device may score the first language model (NNLM) and the second language model (SLM) by using a shallow fusion method using two different models. In an embodiment, the electronic device may linearly combine probability values of data output from the first language model (NNLM) and the second language model (SLM) with respect to the received information. As a result, the electronic device may combine the probability values of data in a manner of selecting a value (e.g., a grapheme) with high probability.

In an embodiment, the electronic device may decompose the provided text (e.g., a context sentence extracted by the context provider module (ContextProvider(SDK))) 710 of FIG. 7A) based on a grapheme in real time and then may generate a second language model (e.g., SLM) based on statistical values according to the frequency of a grapheme string.

In an embodiment, the electronic device may generate the final voice recognition result by calculating data output for each language model depending on a specified weight. For example, the electronic device may recognize a normal sentence and a sentence associated with the provided context information. The voice conversion module 805 may adjust a weight such that the sentence associated with the provided context information is more easily perceived.

In operation 1007, the electronic device may convert the received voice input of a user into a text using the generated language model. In an embodiment, the electronic device may include the first language model (e.g., NNLM) and the second language model (e.g., SLM). The generated language model may be the second language model.

In an embodiment, the electronic device may convert the received voice input of the user into a text by using the generated second language model and the first language model together.

In an embodiment, the electronic device may increase a weight of the generated language model for the received voice input of the user, such that the data stored in units of meanings generated in the generated language model has a sufficient priority. The electronic device may convert the data having the threshold priority into a text corresponding to the received voice input of the user.

In operation 1009, the electronic device may reset the second language model. The electronic device may reset the generated language model, thereby improving real-time performance and reducing memory usage.

In an embodiment, the electronic device may include a first language model (e.g., NNLM) and a second language model (e.g., SLM). The generated language model may be a second language model.

In an embodiment, when at least part of the screen displayed through the display of the electronic device is changed, the electronic device may change at least part of information extracted from the screen. When at least part of the received information is changed, the electronic device may reset (or refresh) the real-time generated second language model and then may regenerate the second language model.

In an embodiment, at least part of a screen displayed through the display of the electronic device may be changed. When at least part of the screen is included in at least one screen provided by an application (or domain) belonging to the same or similar category, the electronic device may update and reuse the second language model.

According to an embodiment, a method performed by an electronic device may include extracting, via at least one processor, at least one piece of context information from a screen displayed on a display, analyzing, via the at least one processor, the extracted at least one piece of context information to generate a language model based on the extracted at least one piece of context information, receiving, via an input circuitry, a voice input of a user and converting the voice input, via the at least one processor, into a text string using the generated language model, and resetting the generated language model.

According to an embodiment, the method performed by the electronic device may further include extracting a voice signal included in the voice input of the user via a sound model stored in memory or in an external device communicatively connected to the electronic device and thus accessible to the processor and training, via the at least one processor, the sound model using a learning algorithm.

According to an embodiment, the extracted at least one piece of context information includes one or more of words, phrases and sentences, and the method performed by the electronic device may further include detecting one or more related words, phrases and sentences having a threshold similarity to the one or more words, phrases and sentences of the extracted at least one piece of context information. The one or more words, phrases and sentences, and the one or more related words, phrases and sentences are embedded into numeric vectors for comparison to detect the threshold similarity.

According to an embodiment, the method performed by the electronic device may further include converting the received voice input of the user into a text string, including adjusting respective weights of the generated language model and another language model, and the another language model is locally stored in a memory, or stored on an external device communicatively connected with the electronic device.

According to an embodiment, the method performed by the electronic device may further include generating at least one grapheme string, including decomposing, in real-time, information included in the extracted at least one piece of context information based on a grapheme string, and the language model is generated based on a statistical value associated with a usage frequency of the grapheme string.

According to an embodiment, the method performed by the electronic device may further include converting, via the at least one processor, the extracted at least one piece of context information in a form of a text array, executing artificial intelligence (AI) training on the generated language model using the extracted at least one piece of context information, and based on the AI training, storing the text array in which one or more of words, phrases and sentences included in the extracted at least one piece of context information are categorized by semantic unit. The voice input is converted into the text string by comparing entries in the stored text array to information included in the voice input.

According to an embodiment, resetting the generated language model is based on detecting a change in at least part of the screen displayed on the display.

According to an embodiment, the method performed by the electronic device may further include executing, via the at least one processor, AI training on the generated language model separately from another language model, wherein the another language model is stored locally in a memory, or stored in an external device communicatively connected with the electronic device.

According to an embodiment, the method performed by the electronic device may further include displaying, on the display, the text string into which the voice input is converted.

According to an embodiment, the method performed by the electronic device may further include identifying, via the at least one processor, a grapheme string included in the extracted at least one piece of context information using at least a morpheme analysis.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   input circuitry;
   a display;
   a processor operatively connected to the input circuitry; and
   a memory operatively connected to the processor,
   wherein the memory stores instructions that, when executed, cause the processor to:
   extract at least one piece of context information based at least in part on an application screen displayed on the display;
   analyze the extracted at least one piece of context information to generate a language model based on the extracted at least one piece of context information, wherein the language model is configured to perform automatic speech recognition;
   receive a voice input of a user through the input circuitry and convert the voice input into a text string using the generated language model; and
   reset the generated language model.

2. The electronic device of claim 1, further comprising:
   a sound model stored in the memory and accessible by the processor,
   wherein the instructions cause the processor to:
   extract a voice signal from the voice input of the user using the sound model, and
   train the sound model using a learning algorithm.

3. The electronic device of claim 1, wherein the extracted at least one piece of context information includes one or more of words, phrases and sentences,
   Wherein the instructions further cause the processor to:
   detect one or more related words, phrases and sentences having a threshold similarity to the one or more related words, phrases and sentences of the extracted at least one piece of context information, and
   wherein the one or more words, phrases and sentences, and the one or more related words, phrases and sentences are embedded into numeric vectors for comparison to detect the threshold similarity.

4. The electronic device of claim 1,
   wherein the instructions further cause the processor to:
   convert the received voice input of the user into a text string, including adjusting respective weights of the generated language model and another language model, and
   wherein the another language model is stored locally in the memory, or stored on an external device communicatively connected with the electronic device.

5. The electronic device of claim 1, wherein the instructions further cause the processor to:
   generate at least one grapheme string, including: decomposing, in real-time, information included in the extracted at least one piece of context information based on a grapheme string, and
   wherein the language model is generated based on a statistical value associated with a usage frequency of the grapheme string.

6. The electronic device of claim 1, wherein the instructions further cause the processor to:
   convert the extracted at least one piece of context information in a form of a text array;
   execute artificial intelligence (AI) training on the generated language model using the extracted at least one piece of context information; and
   based on the AI training, store the text array in which one or more of words, phrases and sentences included in the extracted at least one piece of context information are categorized by semantic unit,
   wherein the voice input is converted into the text string by comparing entries in the stored text array to information included in the voice input.

7. The electronic device of claim 1, wherein the instructions further cause the processor to:
   based on detecting a change in at least part of the application screen displayed on the display, reset the generated language model.

8. The electronic device of claim 1, wherein the instructions further cause the processor to:
   execute AI training on the generated language model separately from another language model,
   wherein the another language model is stored locally in the memory, or stored in an external device communicatively connected with the electronic device.

9. The electronic device of claim 1, wherein the instructions further cause the processor to:
   display, on the display, the text string into which the voice input is converted.

10. The electronic device of claim 1, wherein the instructions further cause the processor to:
    identify a grapheme string included in the extracted at least one piece of context information using at least a morpheme analysis.

11. A method in an electronic device, the method comprising:
    extracting, via at least one processor, at least one piece of context information from a screen displayed on a display;
    analyzing, via the at least one processor, the extracted at least one piece of context information to generate a language model based on the extracted at least one piece of context information, wherein the language model is configured to perform automatic speech recognition;
    receiving, via an input circuitry, a voice input of a user and converting the voice input, via the at least one processor, into a text string using the generated language model; and
    resetting the generated language model.

12. The method of claim 11, further comprising:
    extracting a voice signal included in the voice input of the user via a sound model stored locally in a memory in the electronic device, or in an external device communicatively connected to the electronic device; and
    training, via the at least one processor, the sound model using a learning algorithm.

13. The method of claim 11, wherein the extracted at least one piece of context information includes one or more of words, phrases and sentences,
    wherein the method further comprises: detecting one or more related words, phrases and sentences having a threshold similarity to the one or more related words, phrases and sentences of the extracted at least one piece of context information, and
    wherein the one or more words, phrases and sentences, and the one or more related words, phrases and sentences are embedded into numeric vectors for comparison to detect the threshold similarity.

14. The method of claim 11, further comprising:
    converting the received voice input of the user into a text string, including adjusting respective weights of the generated language model and another language model, wherein the another language model is stored locally in a memory, or stored on an external device communicatively connected with the electronic device.

15. The method of claim 11, further comprising:

generating at least one grapheme string, including decomposing, in real-time, information included in the extracted at least one piece of context information based on a grapheme string, wherein the language model is generated based on a statistical value associated with a usage frequency of the grapheme string.

16. The method of claim 11, further comprising:

converting, via the at least one processor, the extracted at least one piece of context information in a form of a text array, executing artificial intelligence (AI) training on the generated language model using the extracted at least one piece of context information; and based on the AI training, storing the text array in which one or more of words, phrases and sentences included in the extracted at least one piece of context information are categorized by semantic unit, wherein the voice input is converted into the text string by comparing entries in the stored text array to information included in the voice input.

17. The method of claim 11, wherein resetting the generated language model is based on detecting a change in at least part of the screen displayed on the display.

18. The method of claim 11, further comprising:

executing, via the at least one processor, AI training on the generated language model separately from another language model, wherein the another language model is stored locally in a memory, or stored in an external device communicatively connected with the electronic device.

19. The method of claim 11, further comprising:

display, on the display, the text string into which the voice input is converted.

20. The method of claim 11, further comprising:

identifying, via the at least one processor, a grapheme string included in the extracted at least one piece of context information using at least a morpheme analysis.

* * * * *